Oct. 7, 1952 E. P. SNYDER ET AL 2,613,318

COUNTING DOWN CIRCUIT

Filed March 26, 1946

Inventors
JAMES H. MULLIGAN, JR.
ELLERY P. SNYDER

By M. C. Hayes

Attorney

Patented Oct. 7, 1952 2,613,318

UNITED STATES PATENT OFFICE 2,613,318

COUNTING DOWN CIRCUIT

Ellery P. Snyder, United States Navy, Albany, N. Y., and James H. Mulligan, Jr., United States Navy, East Orange, N. J.

Application March 26, 1946, Serial No. 657,322

5 Claims. (Cl. 250—27)

(Granted under the act of March 3, 1883, as amended April 30, 1928; 370 O. G. 757)

This invention relates in general to electrical frequency control circuits and in particular to a frequency divider circuit.

An object of this invention is to provide a frequency divider which assures accurate and positive frequency division at input signal frequencies which are exact integral multiples of the desired output signal frequency.

Another object of this invention is to provide a frequency divider circuit in which the output signal varies linearly to a maximum value with changes in input frequency.

Other objects and features of the present invention will become apparent upon a careful consideration of the following detailed description when taken together with the accompanying drawings.

In general, a frequency divider circuit constructed according to the teachings of the invention, comprises, in part, a signal blocking circuit and a delay circuit so connected thereto as to assure positive and accurate frequency division over a wide range of input signal frequencies.

Figure 1:
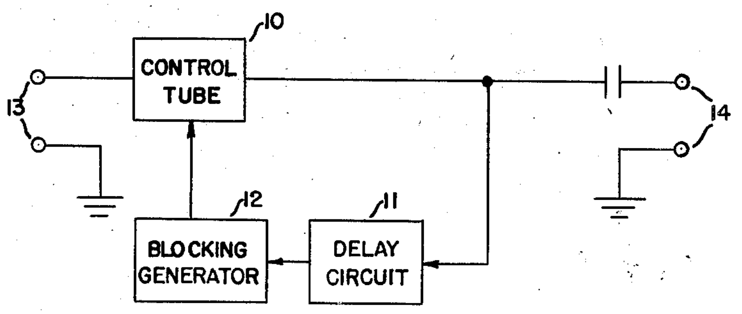
Fig. 1 is a block diagram of one embodiment of the invention.

Specifically, a preferred embodiment of the invention is disclosed in Fig. 1. Output signals of the source (usually a pulse source) over which frequency division is to be effected are impressed across a pair of input terminals 13 and subsequently appear at the output terminals 14. The circuit components which perform frequency division are connected between the input and output terminals 13 and 14 and comprise a control tube 10, a delay circuit 11 and a blocking pulse generator 12. Control tube 10 acts essentially as a switch whose operation is controlled by the blocking generator 12. The latter functions to render tube 10 non-responsive for selectable periods of time, during which, input signals impressed across terminals 13 are blocked from the circuit output terminals 14 with frequency division resulting. In the preferred embodiment blocking generator 12 is of the self-returning multivibrator type which contains a singular stable state of operation but will maintain for a selectable period of time, and in response to a trigger signal, a second, but unstable state of operation. During the unstable state of blocking generator 12, control tube 10 is rendered non-responsive and input signals applied at terminal 13 are consequently blocked from the output terminals 14.

The trigger signal used to drive blocking generator 12 into its unstable state is obtained from the output of control tube 10 and for reasons hereinafter given in detail, is delayed by delay circuit 11 before application to the pulse generator 12. Briefly, however, delay circuit 11, which may take the form of an artificial line, as pulse generating multivibrator, or other suitable device, is added to correct certain impositive action of pulse generator 12 which occurs during a finite interval of time immediately following the instant blocking generator 12 returns to its stable state. During this interval of time blocking generator 12 is non-responsive to trigger signals with the result that it will not drive back into its unstable state until the next succeeding signal at terminal 13. This action causes the output signals at 14 to appear in pairs. If, however, a delay is inserted between the output of control tube 10 and the application of the trigger signal to blocking generator 12 the latter will have time to recover before the delayed trigger signal is applied thereto. Reliable operation of the circuit will thus result, provided, the delay introduced by delay circuit 11 is maintained at something less than the reciprocal of the maximum repetition rate of the input pulses applied at terminals 13. It is, of course, to be understood that delay circuit 11 is only necessary when the repetition period of the input signals is equal to, or an integral multiple of, the blocking period of the generator 12.

Figure 2:
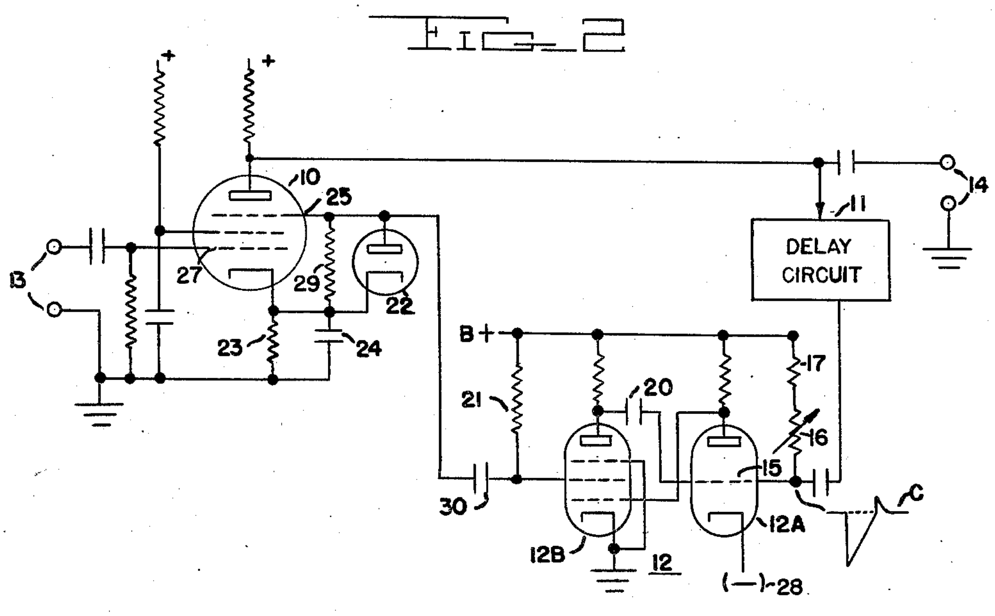
Fig. 2 is a detailed circuit diagram of Fig. 1.

A detailed circuit diagram of the preferred embodiment of the invention is shown in Fig. 2. Tubes 12A and 12B comprise blocking generator 12. The single stable state of this circuit exists when tube 12A is conducting and tube 12B is non-conducting. To this end, grid 15 of tube 12A is returned through resistors 16 and 17 to a positive voltage supply and the cathode is returned directly to a negative voltage supply 28. Tube 12A will thus be quiescently strongly conducting with its plate at virtually its cathode potential. Then if cathode potential 28 is made sufficiently negative a direct conductive connection, as here shown, can be made to grid 18 of tube 12B. The latter tube is shown as a pentode which permits the output signal, used to block control tube 10, to be taken directly from across screen resistance 21. An obvious advantage of this arrangement is that a sharply defined blocking signal is available at the screen of tube 12B since stray capacitances and their deleterious effects on pulse definition are at a minimum at the screen grid. The unstable state of blocking generator 12 is initiated by a negative signal applied to the control grid of tube 12A. In response to this negative signal tube 12A is rendered non-conducting and tube 12B conducting in accordance with usual multivibrator action. Conduction by tube 12B and non-conduction by tube 12A prevails for a period of time depending upon the time constant formed by resistors 16, 17 and the plate to grid coupling capacitor 20. At the instant tube 12B is driven into conduction, excessive screen grid current commences to flow to thereby cause a voltage drop to appear across resistance 21. This voltage drop is applied through capacitor 30 to suppressor grid 25 of control tube 10. This action blocks plate current flow in tube 10 to suppress all output signals at terminals 14. Thus for any given repetition rate of the input signal, the frequency division which results is a function of the period of the unstable state of blocking generator 12 and is adjustable by means of resistance 16. After coupling capacitor 20 has charged up to a predetermined value through resistors 16, 17 tubes 12A and 12B return to and remain conducting and non-conducting respectively until the next succeeding trigger pulse is applied to the grid 15 of tube 12A. At the instant generator 12 returns to normal the grid of tube 12A is driven slightly positive as shown at point C in the accompanying oscillogram. It is during this interval, when the grid of tube 12A is driven positive, that the multivibrator is non-responsive to negative triggering signals applied to grid 15 and for this reason that delay circuit 11 is included between the output of control tube 10 and the input to blocking generating circuit 12. In the practical embodiment of the invention a pulse generating multivibrator was employed at 11 with its pulse period adjusted so that the trailing edge of its pulse occurred at the end of the desired delay interval to trigger blocking generator 12.

In choosing the control tube 10 a pentode was favored because such a tube permitted the simultaneous application of input signals to the control grid 27 and blocking signals to suppressor grid 25 without impairing the desired electrical isolation between a source at terminals 13 and the blocking generator 12. Furthermore such a tube permits the use of self biasing (cathode resistor 23 and capacitor 24) which provides for maximum sensitivity of the circuit. At the start of the unstable period of the multivibrator 12, when tube 12B becomes conducting, tube 10 is only blocked insofar as plate current is concerned and screen grid current may be maintained with the result that the cathode bias may be maintained. To prevent the occurrence of an erroneous output signal at terminals 14 due to the suppressor grid 25 riding positive at the end of the blocking pulse a diode 22 is connected in shunt across the suppressor return resistor 29.

Although we have shown and described only a certain and specific embodiment of the present invention it is to be understood that many modifications are possible thereof, therefore this invention is not to be limited except insofar as necessitated by the spirit of the prior art and the scope of the appended claims.

The invention described herein may be manufactured and used by or for the Government of the United States of America without the payment of any royalties thereon or therefor.

What is claimed is:

1. A frequency divider comprising, a vacuum tube having at least a suppressor, and a control grid, said control grid being adapted to receive input pulses, a keyed pulse generator connected to the output of said tube and operative in response to an output signal from said tube for generating a negative voltage pulse of controllable duration greater than the repetition period of the input pulse signal, and means for applying said negative voltage pulse to the suppressor grid of said tube to thereby render the latter non-responsive for the duration of said negative voltage pulse.

2. A frequency divider comprising, a control tube to which input signals are applied, a delay means connected to the output of said control tube and operating to produce a signal delayed from the output of said control tube by an amount less than the interval between successive input signals, a self returning multivibrator connected to said control tube and to the output from said delay means operative in response to an output signal from said delay means for rendering said control tube non-responsive for a selectable interval of time greater than the repetition period of the input pulse signal.

3. A frequency divider comprising, a vacuum tube having at least a suppressor, and a control grid, said control grid being adapted to receive input signals, a delay means connected to the output of said tube and operating to produce a signal delayed from the output of said tube by an amount less than the interval between successive output signals, a keyed pulse generator connected to the suppressor grid of said tube and to the output of said delay means operative in response to an output signal from said delay means for applying a negative voltage pulse of controllable duration to said suppressor grid to thereby render said tube non-responsive for an interval of time greater than the repetition period of the input pulse signal.

4. A frequency divider comprising, a vacuum tube having at least a suppressor and a control grid, said control grid being adapted to receive input signals, means connected to the output of said tube for producing a signal which is delayed from the output of said tube by an amount less than the interval between successive input signals, a self returning multivibrator connected to said last named means and operative in response to the output thereof for generating a negative voltage pulse of controllable duration and means comprising a diode connecting the output of said multivibrator to the suppressor grid of said tube to thereby render said tube non-responsive for an interval of time greater than the repetition period of the input pulse signal.

5. A frequency divider comprising, an amplifier having input and output terminals with the input terminals arranged to receive the signals to be divided, a keyed pulse generator connected to said amplifier for delivering a blocking voltage pulse thereto, and a time delay circuit coupled to the output terminals of said amplifier and to said pulse generator for delivering a triggering signal to said pulse generator to initiate operation thereof, said time delay circuit providing a time delay less than the interval between successive input signals to said amplifier, and said pulse generator providing a blocking voltage pulse having a duration greater than the repetition period of the signals to be divided.

ELLERY P. SNYDER.
JAMES H. MULLIGAN, JR.

REFERENCES CITED

The following references are of record in the file of this patent:

UNITED STATES PATENTS

| Number | Name | Date |
|---|---|---|
| 2,212,558 | Blumlein | Aug. 27, 1940 |
| 2,418,521 | Morton et al. | Apr. 8, 1947 |
| 2,419,570 | Labin | Apr. 29, 1947 |
| 2,468,058 | Grieg | Apr. 26, 1949 |
| 2,485,591 | Grieg | Oct. 25, 1949 |

FOREIGN PATENTS

| Number | Country | Date |
|---|---|---|
| 479,935 | Great Britain | Feb. 17, 1938 |